(12) United States Patent
Brooks et al.

(10) Patent No.: US 10,824,834 B2
(45) Date of Patent: Nov. 3, 2020

(54) ELECTRONIC LABEL SYSTEM

(71) Applicant: Walmart Apollo, LLC, Bentonville, AR (US)

(72) Inventors: Cristy Crane Brooks, Cassville, MO (US); Benjamin D. Enssle, Bella Vista, AR (US); Greg A. Bryan, Bentonville, AR (US); David Blair Brightwell, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 67 days.

(21) Appl. No.: 16/052,982

(22) Filed: Aug. 2, 2018

(65) Prior Publication Data

US 2019/0042820 A1 Feb. 7, 2019

Related U.S. Application Data

(60) Provisional application No. 62/540,822, filed on Aug. 3, 2017.

(51) Int. Cl.
*G06K 7/10* (2006.01)
*G06K 7/14* (2006.01)
(Continued)

(52) U.S. Cl.
CPC ......... *G06K 7/1417* (2013.01); *G06K 7/1413* (2013.01); *G06K 19/06028* (2013.01);
(Continued)

(58) Field of Classification Search
CPC .............. G06K 7/1417; G06K 7/1413; G06K 19/06028; G06K 19/06037; G06Q 20/20; G06Q 30/0639; G07G 1/12
(Continued)

(56) References Cited

U.S. PATENT DOCUMENTS 7,657,467 B2   2/2010 Deganis et al.
8,321,302 B2  11/2012 Bauer et al.
(Continued)

FOREIGN PATENT DOCUMENTS

WO   2016194276 A1   12/2016

OTHER PUBLICATIONS

E. Frontini, et al., Shelf space re-allocation for out of stock reduction, ScienceDirect: Computers & Industrial Engineering, vol. 106, pp. 32-40, Apr. 2017.
(Continued)

*Primary Examiner* — Karl D Frech
(74) *Attorney, Agent, or Firm* — McCarter & English, LLP

(57) ABSTRACT

Described in detail herein are systems and methods for an electronic label system. Electronic labels display on a display first sets of information associated with sets of like physical objects disposed in a facility. The first computing system can encode a hyperlink into a machine-readable element in response to determining that the quantity is below the threshold. In response to receiving the machine readable element, the electronic label can automatically change the display to render machine-readable element. A portable electronic device can initiate a first session with a second computing system in response to executing an application. The portable electronic device can scan and decode the machine-readable element. The portable electronic device can navigate to a domain hosted by the second computing system. The second computing system initiates a second session. The second computing system merges the first and second session.

20 Claims, 7 Drawing Sheets

(51) Int. Cl.
*G06K 19/06* (2006.01)
*G07G 1/12* (2006.01)
*G06Q 20/20* (2012.01)
*G06Q 30/06* (2012.01)

(52) U.S. Cl.
CPC ....... *G06K 19/06037* (2013.01); *G06Q 20/20* (2013.01); *G06Q 30/0639* (2013.01); *G07G 1/12* (2013.01)

(58) Field of Classification Search
USPC ............ 235/462.1, 383, 385, 462.45, 472.01
See application file for complete search history.

(56) References Cited

U.S. PATENT DOCUMENTS

| | | | |
|---|---|---|---|
| 8,751,334 | B2 | 6/2014 | Wijaya et al. |
| 9,384,460 | B1 | 7/2016 | Grant et al. |
| 2002/0139859 | A1 | 10/2002 | Catan |
| 2005/0149414 | A1 | 7/2005 | Schrodt et al. |
| 2010/0287057 | A1* | 11/2010 | Aihara ................. G06K 7/1095 705/16 |
| 2012/0215657 | A1 | 8/2012 | Compton et al. |
| 2013/0138486 | A1 | 5/2013 | Gao et al. |
| 2013/0313317 | A1 | 11/2013 | Waters |
| 2014/0143039 | A1 | 5/2014 | Branton |
| 2015/0134429 | A1* | 5/2015 | Katakwar .......... G06Q 30/0207 705/14.1 |
| 2015/0248863 | A1* | 9/2015 | Ishikawa ................. G06F 3/147 345/207 |

OTHER PUBLICATIONS

Karabati, Selcuk, et al., A Method for Estimating Stock-Out Based Substitution Rates by Using Point-of-Sale Data, Graduate School of Business, Koc University, Rumeli Feneri Yolu, Sariyer, 34450 Istanbul, Turkey, Graduate School of Sciences and Engineering, Koc University, Rumeli Feneri Yolu, Sariyer, 34450 Istanbul, Turkey, 2009.

International Search Report and Written Opinion from related International Patent Application No. PCT/US2018/044926 dated Oct. 18, 2018.

* cited by examiner

ELECTRONIC LABEL SYSTEM

CROSS-REFERENCE TO RELATED PATENT APPLICATIONS

This application claims priority to U.S. Provisional Application No.: 62/540,822 filed on, Aug. 3, 2017, the content which is hereby incorporated by reference in its entirety.

BACKGROUND

Finding an available physical object can be a slow and error prone process.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the inventive aspects of the present disclosure. In the figures.

DETAILED DESCRIPTION

Figure 1:
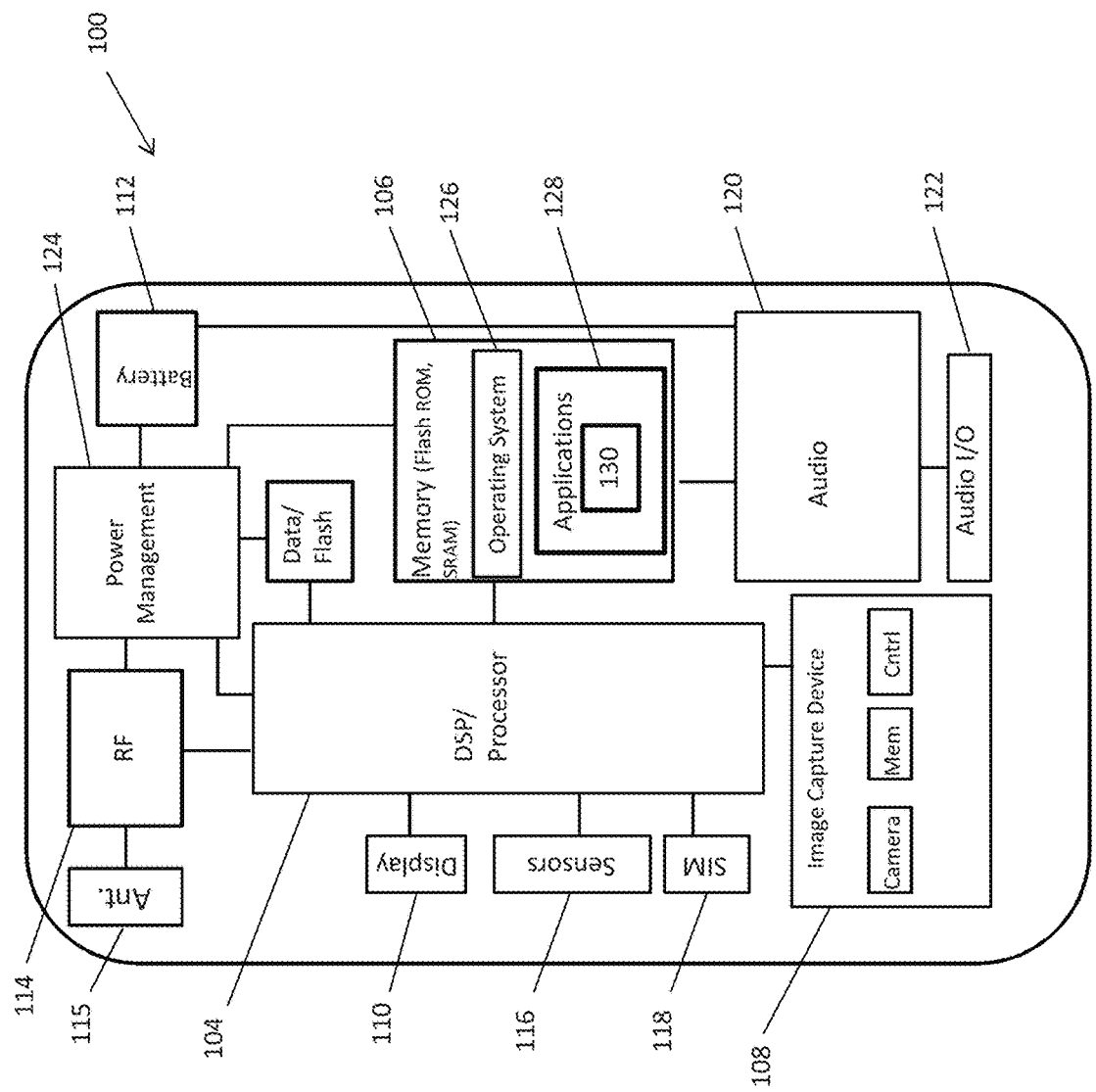
FIG. 1 is a block diagram of a portable electronic device that can be utilized to implement and/or interact with embodiments of an electronic label system.

Described in detail herein are systems and methods for an electronic label system. Electronic labels render on their displays first sets of information associated with sets of like physical objects disposed in a facility. A first computing system in communication with the electronic labels can determine a quantity of at least one set of like physical objects in the sets of like physical object disposed in the facility is below a threshold amount. The first computing system can encode a hyperlink into a machine-readable element in response to determining that the quantity is below the threshold. The first computing system can transmit the machine-readable element an electronic label that is associated with the set of like physical objects. In response to receiving the machine readable element, the electronic label can automatically change the display to the render machine-readable element.

A portable electronic device can initiate a first session with a second computing system in response to executing an application. The portable electronic device includes a scanner and a display. The portable electronic device, using the scanner can, can scan and decode the machine-readable element. The portable electronic device can navigate to a domain hosted by the second computing system. The domain is associated with the hyperlink encoded in the machine-readable element. In response to scanning and decoding the machine-readable element, the second computing system initiates a second session. The second computing system merges the first and second session, and instructs the portable electronic device to display the different set of information on the domain. The first session includes information associated with additional physical objects and the second session includes the information associated with the set of the like physical objects or information associated with one or more affinity objects.

In some embodiments, the information associated with the set of physical objects is automatically included in the second session in response to the second computing system determining a quantity of the set of like physical objects is available on the domain. The second computing system can transmit instructions to the domain to automatically ship the quantity of the set of like physical objects to an address associated with portable electronic device in response to the information being included in the second session.

In some embodiments, the different set of information includes an expected date and time of fulfilment of the at least one set of like physical objects. The portable electronic device can transmit a device identifier to the second computing system in response to executing the application associated with the facility. In response to the portable electronic device scanning the machine-readable element, the second computing system can retrieve information associated with the one or more affinity physical objects based on the device identifier and the one set of like physical objects, and can instruct the portable electronic device to display the information associated with the sets of like physical objects. The portable electronic device can transmit a request to reserve a specified quantity of the set of like physical objects to the second computing system in response to scanning and decoding the machine-readable element.

FIG. 1 is a block diagram of a portable electronic device 100 that can be utilized to implement and/or interact with embodiments of an electronic label system. The portable electronic device 100 can be a smartphone, tablet, subnotebook, laptop, personal digital assistant (PDA), and/or any other suitable portable electronic device that includes a battery and can be programmed and/or configured to implement and/or interact with embodiments of the system via wireless communication. The portable electronic device 100 can include a processing device 104, such as a digital signal processor (DSP) or microprocessor, memory/storage 106 in the form a non-transitory computer-readable medium, an image capture device 108, a touch-sensitive display 110, a power source 112, and a radio frequency transceiver 114. Some embodiments of the portable electronic device 100 can also include other common components commonly, such as sensors 116, subscriber identity module (SIM) card 118, audio input/output components 120 and 122 (including e.g., one or more microphones and one or more speakers), and power management circuitry 124.

The memory 106 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 126 and applications 128 can be embodied as computer-readable/executable program code stored on the non-transitory computer-readable memory 106 and implemented using any suitable, high or low level computing language and/or platform, such as, e.g., Java, C, C++, C #, assembly code, machine readable language, and the like. In some embodiments, the applications 128 can include a facility application 130 to interact with embodiments of the electronic label system. The facility application 130 can be an executable residing on the portable electronic device 100, associated with a facility and physical objects disposed in the facility. One or more servers are described in further detail with respect to FIG. 4. While memory is depicted as a single component those skilled in the art will recognize that the memory can be formed from multiple components and that separate non-volatile and volatile memory devices can be used.

The processing device 104 can include any suitable single- or multiple-core microprocessor of any suitable architecture that is capable of implementing and/or facilitating an operation of the portable electronic device 100. For example, a user can use the portable electronic device 100 in a facility to perform an image capture operation, capture a voice input of the user (e.g., via the microphone), transmit messages including a captured image and/or a voice input and receive messages from a computing system, display data/information including GUIs of the user interface 110, captured images, voice input transcribed as text, and the like. The portable electronic device 100 can perform the aforementioned operations using on an internet browser executing on the portable electronic device, or any web-based application. For example, the portable electronic device 100 can use the image capturing device to scan and decode machine-readable elements such as barcodes or QR codes. The processing device 104 can be programmed and/or configured to execute the operating system 126 and applications 128 to implement one or more processes and/or perform one or more operations. The processing device 104 can retrieve information/data from and store information/data to the storage device 106.

The RF transceiver 114 can be configured to transmit and/or receive wireless transmissions via an antenna 115. For example, the RF transceiver 114 can be configured to transmit data/information, such as input based on user interaction with the portable electronic device 100. The RF transceiver 114 can be configured to transmit and/or receive data/information having at a specified frequency and/or according to a specified sequence and/or packet arrangement.

The touch-sensitive display 110 can render user interfaces, such as graphical user interfaces to a user and in some embodiments can provide a mechanism that allows the user to interact with the GUIs. For example, a user may interact with the portable electronic device 100 through touch-sensitive display 110, which may be implemented as a liquid crystal touch-screen (or haptic) display, a light emitting diode touch-screen display, and/or any other suitable display device, which may display one or more user interfaces (e.g., GUIs) that may be provided in accordance with exemplary embodiments.

The power source 112 can be implemented as a battery or capacitive elements configured to store an electric charge and power the portable electronic device 100. In exemplary embodiments, the power source 112 can be a rechargeable power source, such as a battery or one or more capacitive elements configured to be recharged via a connection to an external power supply.

A user can operate the portable electronic device 100 in a facility, and the graphical user interface can automatically be generated on the portable electronic device 100 in response executing an application associated with the facility. The portable electronic device 100 can be used to scan and decode machine-readable elements disposed on labels. The labels can be disposed on physical objects disposed in the facility and/or on shelving units. The labels can be electronic or e-labels. The application can display information associated with physical objects in response to scanning the machine-readable elements. A user can use the portable electronic device 100 to connect with the World Wide Web, e.g., via a web browser application. The portable electronic device 100 can input and receive data, via the World Wide Web. The data can be stored in a persistent memory of the portable electronic device, such as ROM as described above. Alternatively, or in addition to the data can be stored in temporary buffers of the portable electronic device such as SRAM or Flash memory as described above. The portable electronic device 100 can communicate with a first and second computing system. The first and second computing systems will be described in further detail with respect to FIG. 4.

Figure 2:
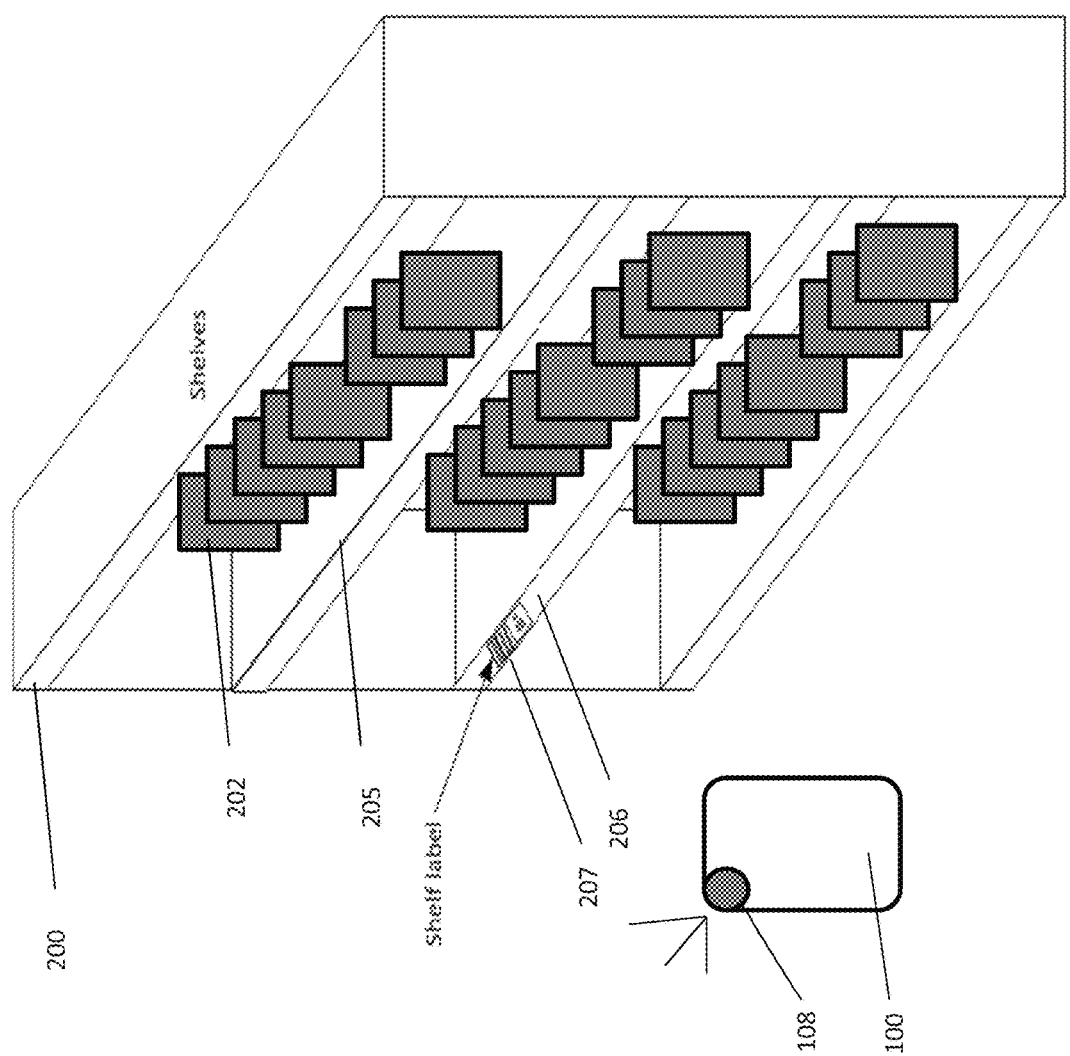
FIG. 2 is a schematic diagram of an exemplary shelving unit with electronic shelf-labels according to an exemplary embodiment.

FIG. 2 is a block diagram of an exemplary shelving unit 200 with electronic shelf-labels 207 according to an exemplary embodiment. The shelving unit 200 can include physical objects 202 disposed on shelves 205. The shelves 205 can be configured to support and store the physical objects 202. The shelves 205 can include a top or supporting surface extending the length of the shelf 205. In one embodiment, the supporting structure that maintains the shelves 204 substantially parallel to horizontal can include vertical supports. The shelves 204 can also include a front face 206.

Electronic shelf-labels 207 can be disposed on the front face 206 of the shelves 205. The electronic shelf-labels 207 can include a display. The electronic shelf-labels 207 can be configured to display information, via the display, that is associated with each of the like physical objects disposed on the shelves 204. Each electronic shelf-label 207 can be disposed underneath or with respect to the like physical object for which the electronic shelf label 207 is displaying information and to which the electronic shelf-label is assigned. The electronic shelf-label 207 can also display a machine-readable element encoded with an identifier associated with the set of like physical objects to which it is assigned.

The electronic shelf-label 207 can dynamically change the information rendered on the display based on signals received from a first computing system. The electronic shelf-label 207 can communicate with the first computing system. The first computing system is described herein with respect to FIG. 4.

Figure 3A:
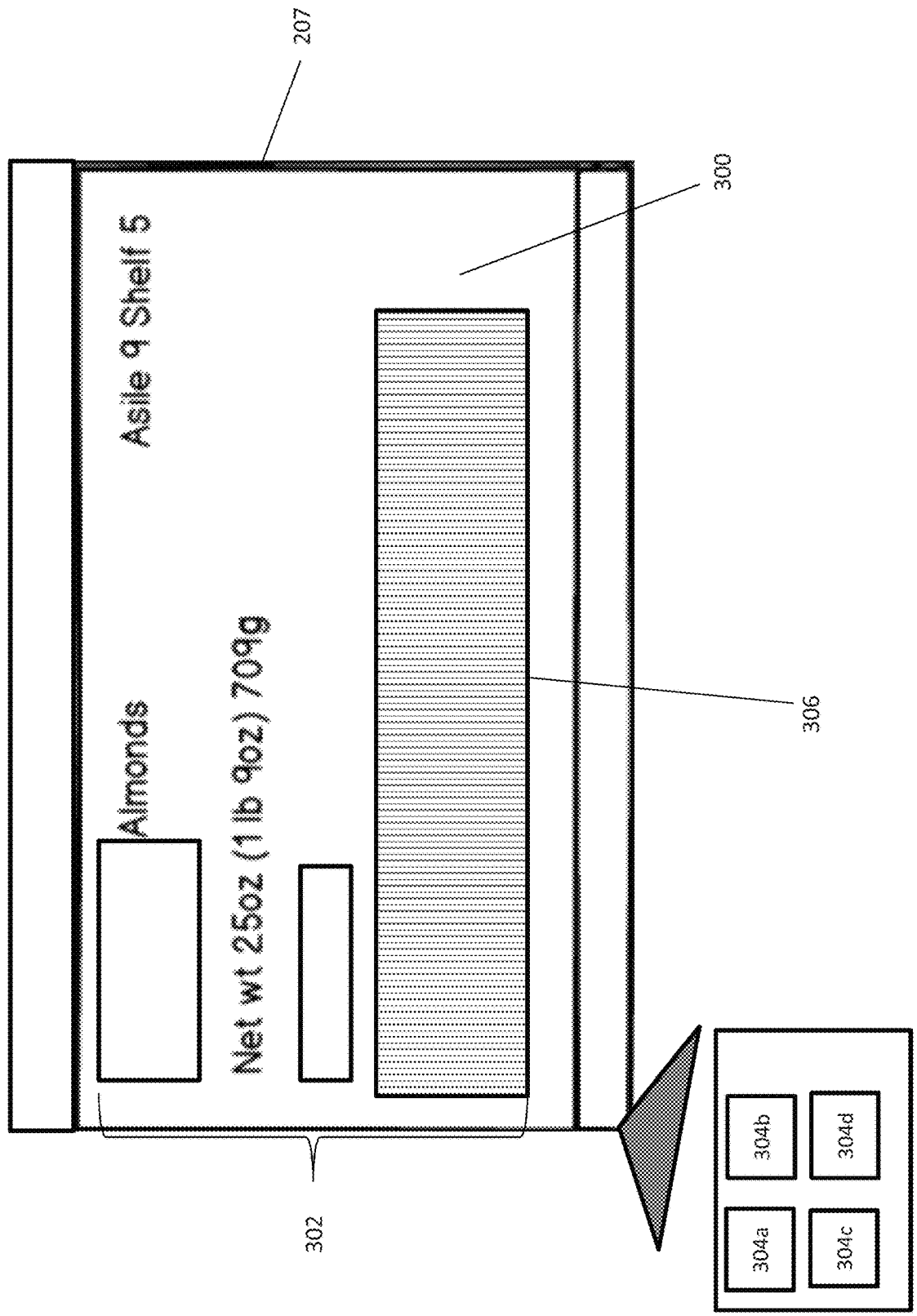
FIGS. 3A-3B illustrates an exemplary electronic shelf-label system in accordance with an exemplary embodiment.
Figure 3B:
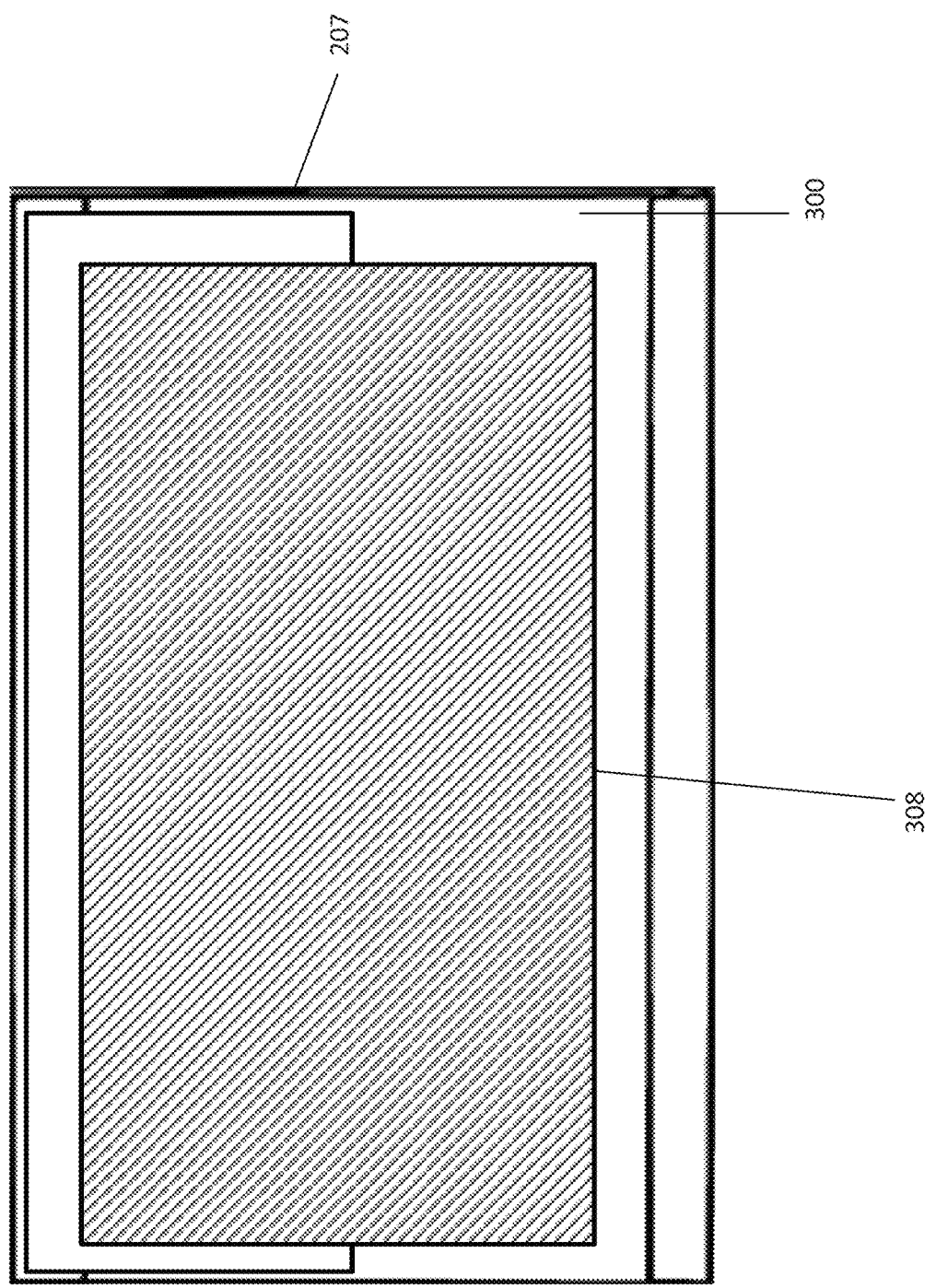

FIGS. 3A-3B are block diagrams of an exemplary electronic shelf-label 207 according to an exemplary embodiment. With reference to FIG. 3A, the electronic shelf-label 207 can include a display 300, a controller 304a, a power source 304b, a transceiver 304c, and memory 304d. The display 300 can be a LED display, e-paper, electrophoretic display, microencapsulated electrophoretic display, electrowetting display, electrofluidic display or a plasmonic electronic display. The display 300 can be configured to be controlled by the controller 304a to display information 302 associated with a physical object and a machine-readable element 306 encoded with an identifier associated with the physical object. The machine-readable element 306 can be a barcode or a QR code. The information can include the name of the physical object, weight, size, dimensions, location within the facility, and a date and timestamp of when more like physical objects will be deposited in the location of the within the facility.

The power source 304b can provide power to the display 300, the controller 304a, the transceiver 304c, and the memory 304d. The transceiver 304c can include a radiofrequency transmitter and a receiver and can be configured to communicate with a first computing system. Based on signals received from first computing system, via the transceiver 304c, the controller 304a can control the display to change the information rendered on the display 300.

With reference to FIG. 3B, the transceiver 304c can receive signals from the first computing system to change the display. The controller 304a can control the display 300 from rendering the information associated with the physical object as shown and the machine readable element as shown in FIG. 3A to rendering to a different machine-readable element 308 encoded with a different identifier. The first computing system is described herein with respect to FIG. 4.

Figure 4:
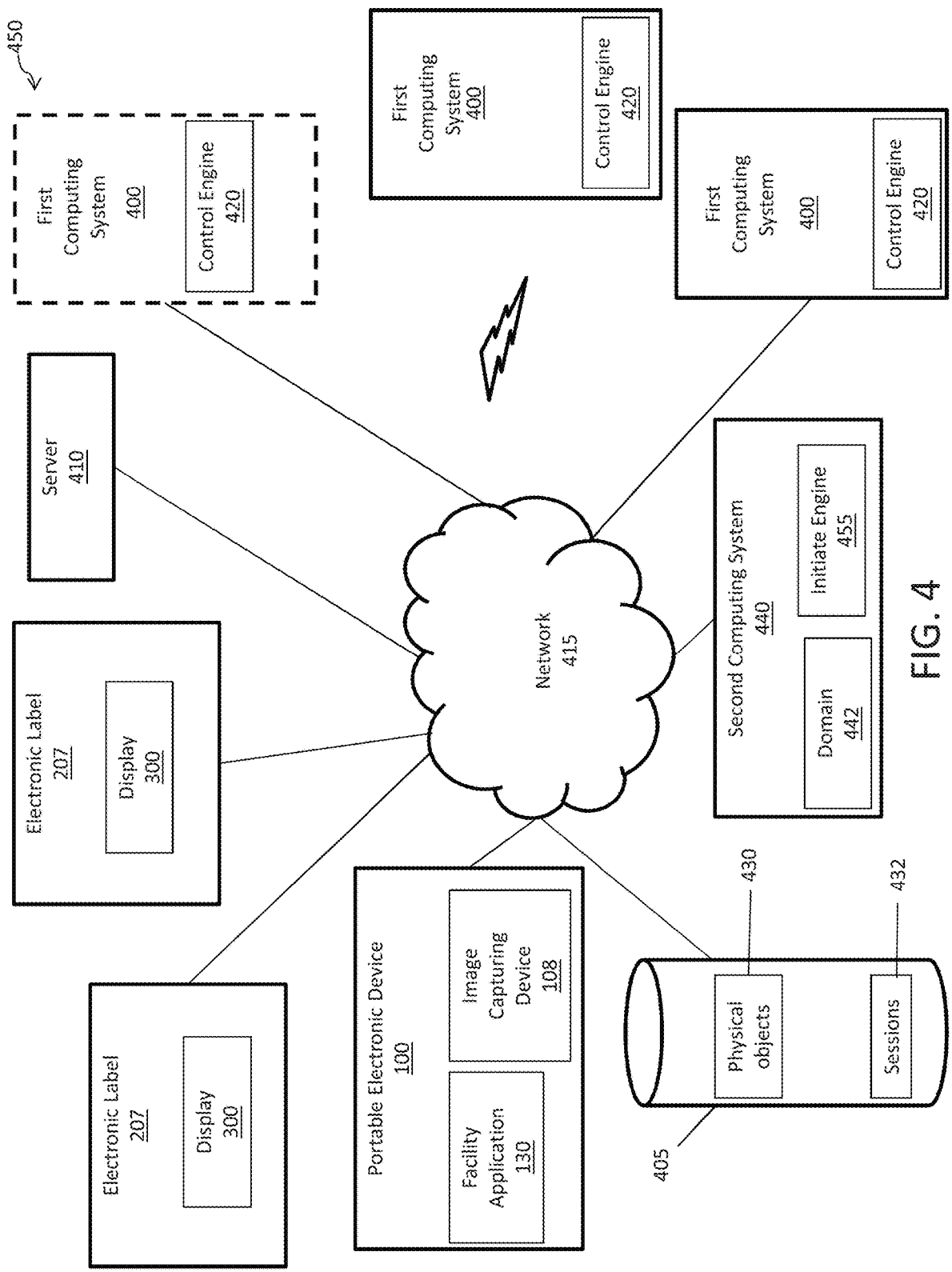
FIG. 4 illustrates a network diagram of an electronic label system in accordance with an exemplary embodiment.

FIG. 4 illustrates a network diagram of an electronic label system in accordance with an exemplary embodiment. The electronic label system 450 can include one or more databases 405, one or more first computing systems 400, one or more second computing systems 440, one or more portable electronic devices 100, and one or more electronic labels 207 communicating over communication network 415. The portable electronic device 100 can include the image capturing device 108 configured to scan and decode machine-readable elements. As discussed above, the portable electronic device 100 can also execute the facility application 130. The electronic label 207 can include a display 300. The first computing system 400 can execute a control engine 420. The control engine 420 can be an executable application residing on the first computing system 400 to implement the electronic label system 450 as described herein. The second computing system 440 can include a domain 442 and an initiation engine 455. The initiation engine 455 can be an executable application residing on the second computing system 440 to implement the electronic label system 450 as described herein. The second computing system 440 can be a server and/or web server which hosts a domain 442. The domain 442 can be a website.

In an example embodiment, one or more portions of the communications network 415 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first computing system 400 includes one or more computers or processors configured to communicate with the databases 405, the portable electronic devices 100, the electronic labels 207, and the second computing systems 440, via the network 415. The first computing system 400 hosts one or more applications configured to interact with one or more components of the electronic label system 450. The databases 405 may store information/data, as described herein. For example, the databases 405 can include a physical objects database 430 and a sessions database 432. The physical objects database 430 can store information associated with physical objects. The sessions database 435 can store information associated with sessions active in the facility applications 445 and the domain 442. The databases 405 can be located at one or more geographically distributed locations from the first computing system 400. Alternatively, the databases 405 can be included within the first computing system 400.

In one embodiment, a user can operate the portable electronic device 100 in a facility. The user can execute the facility application 130 on the portable electronic device 100. In response to executing the facility application 130, the portable electronic device 100 can request to connect to the second computing system 440. The second computing system 440 can execute the initiation engine 455 in response to receiving the request. The initiation engine 455 can initiate a session between the first computing system 400 and the facility application 130. The initiation engine 455 can store the session in the sessions database 432 using an identifier of the portable electronic device 100. The facility application 130 can transmit the identifier to the second computing system along with the request. The identifier can be one or more of Unique Device ID (UDID), the International Mobile Equipment Identity (IMEI), Integrated Circuit Card Identifier (ICCID) and/or the Mobile Equipment Identifier (MEID).

Electronic labels 207 can be disposed on a front face of shelving units in the facility. Physical objects can be disposed on the shelving units and the electronic labels 207 can be disposed with respect to the physical objects. Each electronic label 207 can be associated with a set of like physical objects and can render information about the set of like physical objects and a machine-readable element encoded with an identifier associated with the set of like physical objects, on the display 300.

The image capturing device 108 of the portable electronic device 100 can be used to scan and decode identifiers from machine-readable elements displayed on the electronic labels 207. For example, the image capturing device 108 can scan and decode an identifier from a machine-readable element disposed on an electronic label 207 associated with a set of like physical objects. In response to scanning and decoding the identifier from a machine-readable element disposed on a label, the facility application 130 can transmit the identifier to the second computing system 440. The initiation engine 455 can query the physical objects database 430 to retrieve information associated with the set of like physical object using the received identifier. The initiation engine 455 can transmit the information associated with the set of like physical objects to the facility application 130. The facility application 130 can display the information associated with the set of like physical objects on the display of the portable electronic device 100. The portable electronic device 100 can receive input associated with including a quantity of like physical objects in the session. The facility application 130 can transmit a request to include the quantity of like physical objects in the session to the second computing system 440. The initiation engine 455 can update the session stored in the sessions database 432 to include the quantity of like physical objects.

The first computing system 400 can execute the control engine 420. The control engine 420 can determine that a different set of like physical objects are absent from the facility based on determining that a quantity of physical objects disposed in the facility, as indicated in the physical objects database 430 is below a threshold amount. The control engine 420 can generate a different machine-readable element encoded with a hyperlink associated with a URL that refers to the domain 442 hosted by the second computing system. The control engine 420 can control the display 300 of the electronic label 207 associated with the absent set of like physical objects, to render the different, newly generated, machine-readable element.

The image capturing device 108 can scan and decode the hyperlink from the different machine-readable element disposed on the electronic label 207 associated with the absent set of like physical objects. The portable electronic device 100 can embed an internet browser in the application using an Application Program Interface (API) on the portable electronic device 100 and direct the internet browser to the domain 442 hosted by the second computing system 440, in response to decoding the hyperlink. The initiation engine 455 can initiate a new session between the portable electronic device 100 and the domain 442. The initiation engine 455 can store the new session in the sessions database 432 using the identifier of the portable electronic device 100. The set of like physical objects which are absent from the facility can be available on the domain 442. The portable electronic device 100 can receive input to include a quantity of the set of like physical objects available on the domain 442, in the session. The portable electronic device 100 can transmit a request to the second computing system 440 to include the quantity of quantity of the set of like physical objects available on the domain 442, in the session. The initiation engine 455 can receive the request and include the quantity of the set of like physical objects available on the domain 442, in the session between the portable electronic device 100 and the domain 442.

The initiation engine 455 can merge the session between the facility application 130 and the initiation engine 455 and the session between the portable electronic device 100 and the domain 442. The session between the facility application 130 and the initiation engine 455 can include the information associated with physical objects present at the facility for which the associated machine-readable element has been scanned by the portable electronic device 100. The session between the portable electronic device 100 and the domain 442 can include the physical objects absent from the facility and available on the domain 442. In some embodiments, in response to navigating to the domain 442, the initiation engine 455 can automatically initiate a new session, include the set of like physical objects absent from the facility and present on the domain 442, in the session and transmit instructions to the domain 442 to ship the set of like physical objects to a physical address associated with the user of the portable electronic device. In some embodiments the initiation engine 455 can instruct the domain 442 to display information associated with the absent set of like physical objects. The information can include an estimated data and time of when the facility will receive additional like set of physical objects.

In one embodiment, the initiation engine 455 can add the information from one session into the other session based on the location of the portable electronic device 100. For example, in the event the initiation engine 455 can determine the portable electronic device 100 is within the facility, the initiation engine 455 can add the information from the session between the portable electronic device 100 and the domain 442 into the session between the facility application 130 and the initiation engine 455. Alternatively, in the even the initiation engine 455 determines the portable electronic device 100 is outside the facility, the initiation engine 455 can add the information from the session between the facility application 130 and the initiation engine 455 into the session between the portable electronic device 100 and the domain 442.

As a non-limiting example, the electronic label system 450 can be implemented in a retail store and/or e-commerce activity. The facility application 130 can be embodied as a self-checkout application. The physical objects database 432 can store information associated with inventory of products for sale in facilities. A customer can operate the portable electronic device 100 in a retail store. The user can execute the facility application 130 on the portable electronic device 100. The second computing system 440 can execute the initiation engine 455 in response to receiving the launch of the facility application 130. The initiation engine 455 can initiate a session between the first computing system 400 and the facility application 130. The initiation engine 455 can store the session in the sessions database 432 using an identifier of the portable electronic device 100.

Electronic labels 207 can be disposed on a front face of shelving units in the retail store. Products can be disposed on the shelving units and the electronic labels 207 can be disposed with respect to the products. Each electronic label 207 can be associated with a set of like products and can render information about the set of like products and a machine-readable element encoded with an identifier associated with the set of like products, on the display 300.

The image capturing device 108 of the portable electronic device 100 can be used to scan and decode identifiers from machine-readable elements displayed on the electronic labels 207. For example, the image capturing device 108 can scan and decode an identifier from a machine-readable element disposed on an electronic label 207 associated with a set of like products. In response to scanning and decoding the identifier from a machine-readable element disposed on a label, the facility application 130 can transmit the identifier to the second computing system 440. The initiation engine 455 can query the physical objects database 430 to retrieve information associated with the set of like product using the received identifier. The facility application 130 can display the information associated with the set of like products on the display of the portable electronic device 100. If the user confirms his/her intent to purchase the set of like products, a virtual shopping cart containing item information representing the set of like products.

In one embodiment, the virtual shopping cart is generated by the portable electronic device 100. Preferably, any contents in the virtual shopping cart which represent the set of like products are kept in the virtual shopping cart for a predefined period of time, after which the contents are deleted. If the shopping process, is interrupted for any reason (for example a phone call is received by the portable electronic device 100, a text message is received by the portable electronic device 100, the user wishes to perform another function with the portable electronic device 100, etc.) the user can resume the process and continue using the virtual shopping cart representing the already selected the set of like products for a predefined period of time. In one embodiment, the facility application 130 provides the user with the option to create and save a shopping list having all the set of like products represented in the virtual shopping cart. The shopping list can be created any place, such as a user's home. When using the shopping list in a retail establishment as part of shopping process, products may be paired up and removed from the shopping list and then added to the virtual shopping cart.

In one embodiment, upon retrieving product information, the control engine 420 may then transmit the retrieved to the portable electronic device 100, whereupon facility application 130 may automatically generate a virtual shopping cart containing product information representing the set of like products.

Upon generating a virtual shopping cart 433 containing product information representing the set of like products, the portable electronic device 100 then displays a virtual shopping cart along with all of its contents to the customer. The portable electronic device 100 can receive input associated with including a quantity of like products in the virtual shopping cart. The facility application 130 can transmit a request to include the quantity of like products in the virtual shopping cart. The initiation engine 455 can update the session stored in the sessions database 432 to include the quantity of like products.

The physical objects database 432 can transmit an alert based on low inventory of a set of like psychical objects in a retail store. The control engine 420 can determine that a different set of like products are absent and/or out of stock from the retail store based on determining that a quantity of products disposed in the retail store, as indicated in the physical objects database 430 is below a threshold amount. The control engine 420 can generate a different machine-readable element encoded with a hyperlink associated with the domain 442 hosted by the second computing system 440. The control engine 420 can control the display 300 of the electronic label 207 associated with the absent set of like products, to render the different, newly generated, machine-readable element.

The image capturing device 108 can scan and decode the hyperlink from the different machine-readable element disposed on the electronic label 207 associated with the absent set of like products. As discussed above, the portable electronic device 100 can embed an internet browser in the facility application 130 and direct the internet browser to the domain 442 hosted by the second computing system 440, in response to decoding the hyperlink. The domain 442 can be an e-commerce website associated with the retail store. The initiation engine 455 can initiate a new session between the portable electronic device 100 and the domain 442. The initiation engine 455 can store the new session in the sessions database 432 using the identifier of the portable electronic device 100. The set of like products which are absent from the facility can be available on the domain 442. The portable electronic device 100 can receive input to include a quantity of the set of like products available on the domain 442, in a virtual shopping cart in the domain 442. The portable electronic device 100 can transmit a request to the second computing system 440 to include the quantity of quantity of the set of like products in the virtual shopping cart in the domain 442. The initiation engine 455 can update the session to include the quantity of the set of like products available on the domain 442. In some embodiments, the set of like products may not be available at the retail store or on the domain 442. The initiation engine 455 can retrieve affinity products available at the retail store or the domain 442. Affinity products can be products similar to the set of like products unavailable at the retail store and domain 442 and/or products that are often purchased together. The initiation engine 455 can present the affinity products on the display of the portable electronic device 100. The customer can chose to include one or more of the affinity products in the virtual shopping cart on the domain 442.

The initiation engine 455 can merge the session between the facility application 130 and the initiation engine 455 and the session between the portable electronic device 100 and the domain 442. For example, the initiation engine 455 can merge the virtual shopping cart from the facility application with the virtual shopping cart on the domain 442. The products from the two different shopping carts can be merged into one single shopping cart. The customer can use checkout and complete the transaction using the facility application, the domain 442, and/or at a Point of Sale (POS) terminal disposed in the retail store.

In some embodiments, in response to navigating to the domain 442, the initiation engine 455 can automatically initiate a new session, include the set of like products absent from the facility and present on the domain 442, in the session and transmit instructions to the domain 442 to ship the set of like products to a physical address associated with the user of the portable electronic device. In some embodiments the initiation engine 455 can instruct the domain 442 to display information associated with the absent set of like products. The information can include an estimated data and time of when the retail store will receive additional like set of products. In some embodiments, the domain 442 can reserve the quantity of products.

In one embodiment, the initiation engine 455 can add the information from one session into the other session based on the location of the portable electronic device 100. For example, in the event the initiation engine 455 can determine the portable electronic device 100 is within the retail store, the initiation engine 455 can add the information from the session between the portable electronic device 100 and the domain 442 into the session between the facility application 130 and the initiation engine 455. Alternatively, in the even the initiation engine 455 determines the portable electronic device 100 is outside the facility, the initiation engine 455 can add the information from the session between the facility application 130 and the initiation engine 455 into the session between the portable electronic device 100 and the domain 442.

For example, a customer can chose to complete the purchase of the products in the retail store. The initiation engine 455 can include the products from the virtual shopping cart of the domain 442 into the virtual shopping cart of the facility application 130. Alternatively, if the customer leaves the facility without completing the purchase, the initiation engine 455 can include the products in the virtual shopping cart of the facility application 130 and include the products in the virtual shopping cart of the domain 442. In some embodiments, in the event the customer has left the facility without purchasing the product, the initiation engine 442 can prompt the customer to complete the purchase of the products using a payment device associated with the domain 442.

In one embodiment, once the user has completed the shopping process, the customer can select and/or the customer may make a hand gesture, a swipe, or other such gesture to activate a feature of facility application 130. Upon selecting the option to checkout, a total amount for all the contents of the virtual shopping cart is calculated and an order is generated for the set of like products, listed in the virtual shopping cart. Preferably, an order number associated with the order is also generated. Upon generating the order, the customer is then presented with the order asked to confirm the accuracy of the order.

Upon confirming a customer's intent to purchase the customer selects the type of tender and the payment method used to pay for the order which was generated. The user has the choice of providing a variety of types of tender, such as cash, credit card, direct debit from a bank, payment using an online payment service such as PayPal™ or Google Checkout, a gift card, store credit, personal check, money order, or other payment means. The user also has the choice of payment method, either transmitting payment via the portable electronic device 100 using facility application 130 or providing payment at either a traditional cashier or self-checkout station. As mentioned above, the initiation engine 455 can merge virtual shopping cart from the facility application with the virtual shopping cart on the e-commerce website. Accordingly, the customer can pay for products from the merged virtual shopping cart using the facility application 130. Alternatively, the facility application can generate an optical machine readable element encoded with the order number representing the order. The optical machine-readable element can be presented to a point of sale (POS) terminal. The order can be retrieved by scanning the optical machine-readable element. The customer can pay for the order at the POS terminal.

Figure 5:
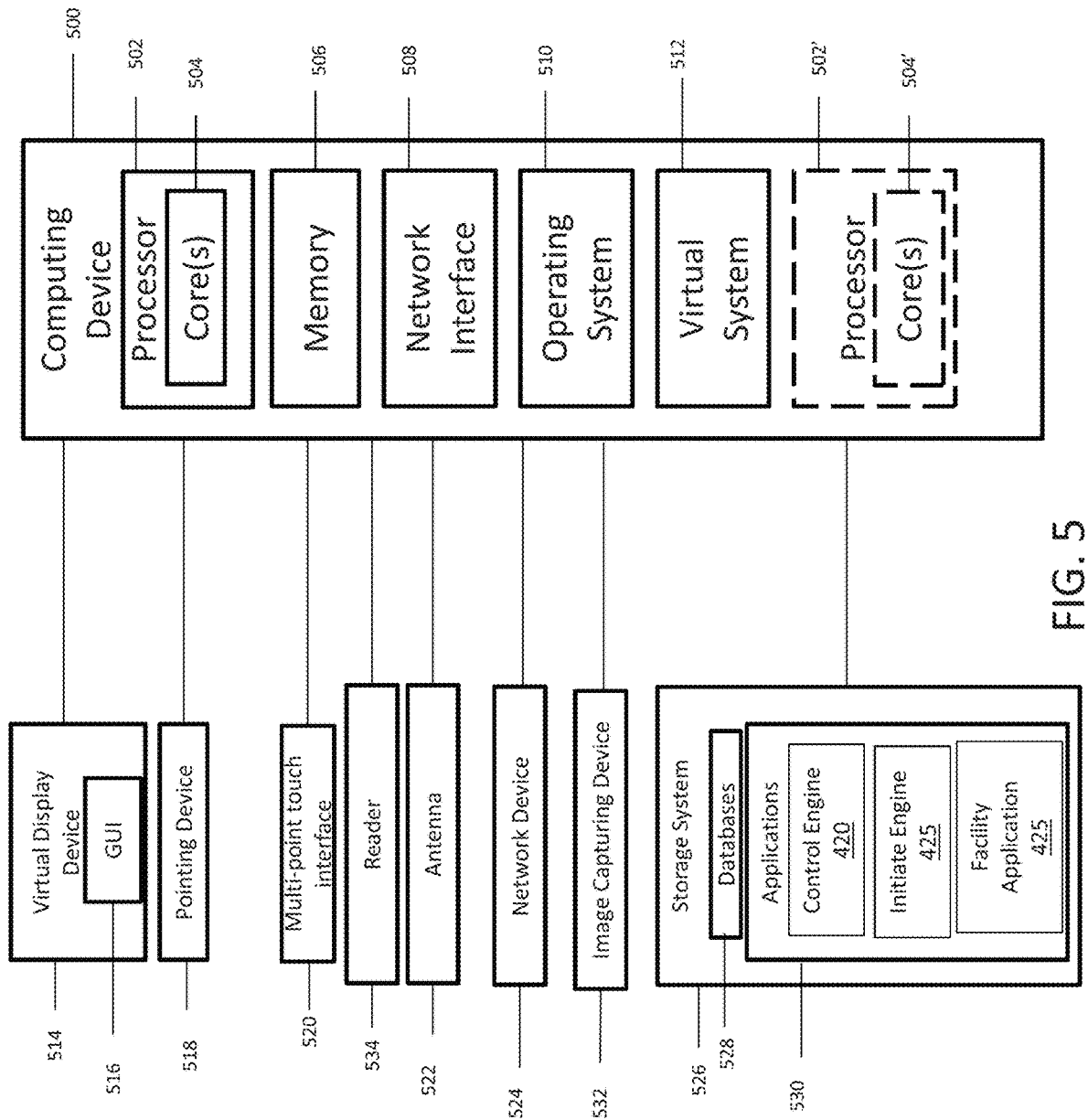
FIG. 5 illustrates a block diagram of an exemplary computing device in accordance with an exemplary embodiment.

FIG. 5 is a block diagram of an exemplary computing device suitable for implementing embodiments of the electronic label system. The computing device may be, but is not limited to, a smartphone, laptop, tablet, desktop computer, server or network appliance. The computing device 500 can be embodied as the central computing system, remote system, and/or autonomous robot device. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530 such as a web browser, the control engine 420, the facility application 130, and the initiation engine 455) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. The computing device 500 can receive data from input/output devices such as, a reader 534 and an image capturing device 532.

A user may interact with the computing device 500 through a visual display device 514, such as a computer monitor, which may display one or more graphical user interfaces 516, multi touch interface 520 and a pointing device 518.

The computing device 500 may also include one or more storage devices 526, such as a hard-drive, CD-ROM, or other computer readable media, for storing data and computer-readable instructions and/or software that implement exemplary embodiments of the present disclosure (e.g., applications such as a web browser, the control engine 420, the facility application 130, and the initiation engine 455). For example, exemplary storage device 526 can include one or more databases 328 for storing information regarding the physical objects and sessions. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
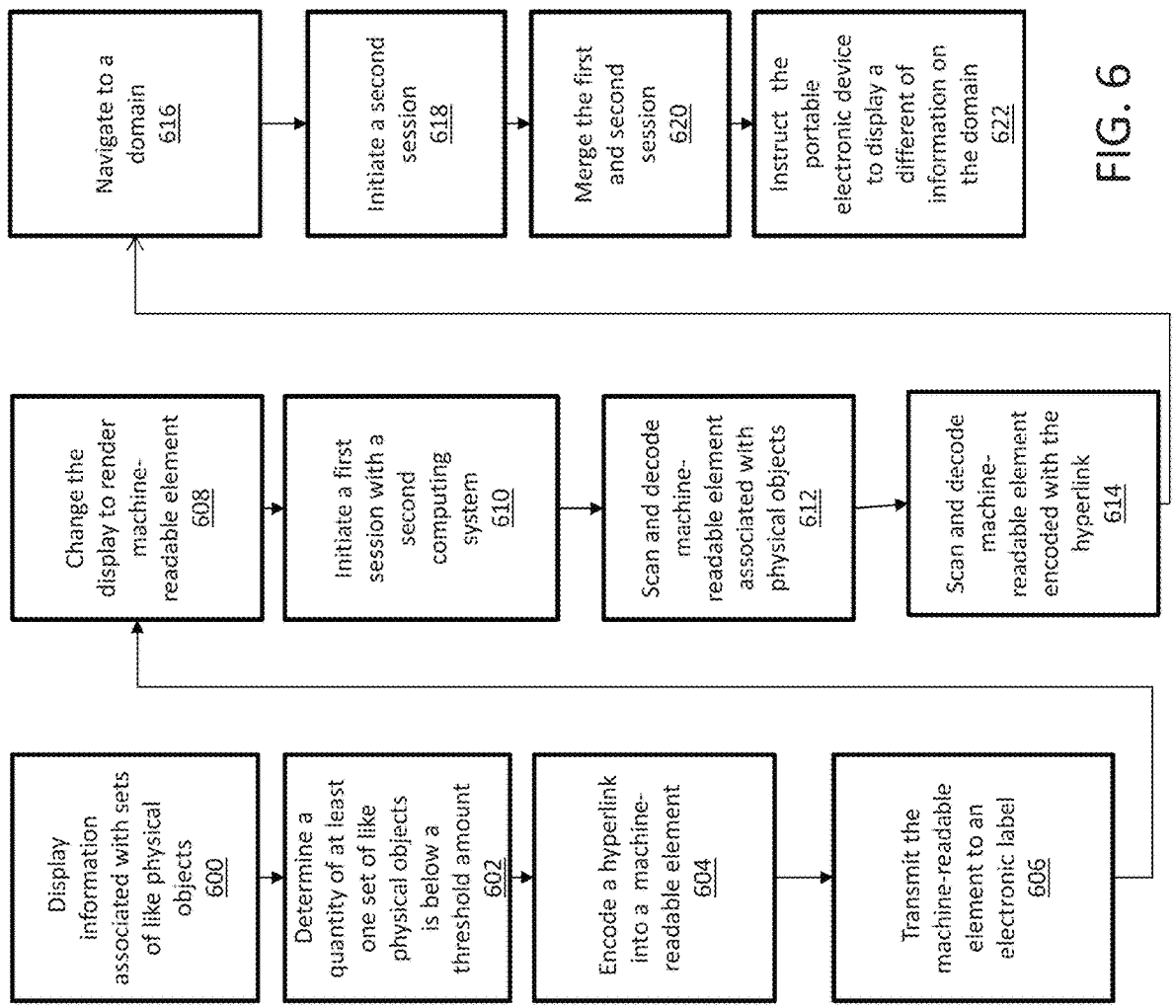
FIG. 6 is a flowchart illustrating a process implemented by an electronic label system according to an exemplary embodiment.

FIG. 6 is a flowchart illustrating a process implemented by an electronic label system according to an exemplary embodiment. In operation 600, electronic labels (e.g. electronic labels 207 as shown in FIGS. 2-4) render on a display (e.g. display 300 as shown in FIGS. 3A-B) information (e.g. information associated with the physical objects 302 and a machine-readable element 306 as shown in FIG. 3A) associated with sets of like physical objects (e.g. physical objects 202 as shown in FIG. 2) disposed in a facility. In operation 602, a first computing system (e.g. first computing system 400 as shown in FIG. 4) in communication with the electronic labels, can determine a quantity of at least one set of like physical objects in the sets of like physical object disposed in the facility is below a threshold amount. In operation 604, the first computing system can encode a hyperlink into a machine-readable element (e.g. machine-readable element 308 as shown in FIG. 3B) in response to determining that the quantity is below the threshold. In operation 606, the first computing system can transmit the machine-readable element to an electronic label that is associated with the set of like physical objects.

In operation 608, in response to receiving the machine readable element, the electronic label can automatically change the display to render machine-readable element. In operation 610, a portable electronic device (e.g. portable electronic device 100 as shown in FIGS. 1 and 4) can initiate a first session with a second computing system (e.g. second computing system 440 as shown in FIG. 4) in response to executing an application (e.g. associated with the facility application 130 as shown in FIG. 4). The portable electronic device includes a scanner (e.g. image capturing device 108 as shown in FIGS. 1, 2 and 4) and a display (e.g. display 110 as shown in FIG. 1). In operation 612, the portable electronic device can scan and decode machine-readable elements associated with physical objects to add the physical objects to a list. In operation 614, the portable electronic device, using the scanner can, scan and decode the machine-readable element encoded with a hyperlink to a domain. In operation 616, the portable electronic device can navigate to a domain (e.g. domain 442 as shown in FIG. 4) hosted by the second computing system. The domain is associated with the hyperlink encoded in the machine-readable element. In operation 618, in response to scanning and decoding the machine-readable element the second computing system initiates a second session. In operation 620, the second computing system merges the first and second session. In operation 622, the second computing system instructs the portable electronic device to display a different of information on the domain.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An electronic label system, the system comprising:
a plurality of electronic labels including a display, the electronic labels configured to display first sets of information associated with sets of like physical objects disposed in a facility;
a first computing system in communication with the plurality of electronic labels, the first computing system configured to:
determine a quantity of at least one set of like physical objects in the sets of like physical object disposed in the facility is below a threshold amount;
encode a hyperlink into a first machine-readable element in response to determining that the quantity is below the threshold;
transmit the first machine-readable element to at least one of the electronic labels that is associated with the at least one set of like physical objects,
wherein in response to receiving the first machine readable element the at least one of the electronic labels is configured to automatically change the display to render the first machine-readable element, and
a portable electronic device including a scanner and a display, the portable electronic device being configured to:
initiate a first session with a second computing system in response to executing an application associated with the facility;
scan and decode, using the scanner, the first machine-readable element; and
navigate to a domain hosted by the second computing system, the domain associated with the hyperlink encoded in the first machine-readable element,
wherein in response to scanning and decoding the first machine-readable element, the second computing system initiates a second session, merges the first and second session, and instructs the portable electronic device to display the second set of information on the domain.

2. The system of claim 1, wherein the first session includes information associated with additional physical objects.

3. The system of claim 2, wherein the second session includes one or more of: the first set of information associated with the at least one set of the like physical objects or information associated with one or more affinity objects.

4. The system of claim 3, wherein the first set of information associated with the at least one set of physical objects is automatically included in the second session in response to the second computing system determining a quantity of the at least one set of like physical objects is available on the domain.

5. The system of claim 4, wherein the second computing system transmits instructions to the domain to automatically ship the quantity of the at least one set of like physical objects to an address associated with portable electronic device in response to the first set of information being included in the second session.

6. The system of claim 1, wherein the second set of information includes an expected date and time of fulfilment of the at least one set of like physical objects.

7. The system of claim 1, wherein the portable electronic device is configured to transmit a device identifier to the second computing system in response to executing the application associated with the facility.

8. The system of claim 7, wherein in response to the portable electronic device scanning the first machine-readable element, the second computing system is configured to:
retrieve information associated with the one or more affinity physical objects based on the device identifier and the at least one set of like physical objects; and
instruct the portable electronic device to display the information associated with the sets of like physical objects.

9. The system of claim 1, wherein the first set of information includes a second machine-readable element encoded with an identifier associated with the at least one set of like physical objects.

10. The system of claim 1, wherein at least one portable electronic device is configured to transmit a request to reserve a specified quantity of the at least one set of like physical objects to the second computing system in response to scanning and decoding the first machine-readable element.

11. An electronic label method, the method comprising:
displaying, via a plurality of electronic labels including a display, first sets of information associated with sets of like physical objects disposed in a facility;
determining, via a first computing system in communication with the plurality of electronic labels, a quantity of at least one set of like physical objects in the sets of like physical object disposed in the facility is below a threshold amount;
encoding, via the first computing system, a hyperlink into a first machine-readable element in response to determining that the quantity is below the threshold;
transmitting, via the first computing system, the first machine-readable element to at least one of the electronic labels that is associated with the at least one set of like physical objects;
in response to receiving the first machine readable element, automatically changing, via the at least one of the electronic labels, the display to render the first machine-readable element;
initiating, via a portable electronic device including a scanner and a display, a first session with a second computing system in response to executing an application associated with the facility;
scanning and decoding, via the portable electronic device, using the scanner, the first machine-readable element;
navigating, via the portable electronic device, to a domain hosted by the second computing system, the domain associated with the hyperlink encoded in the first machine-readable element;
in response to scanning and decoding the first machine-readable element, initiating, via the second computing system, a second session;
merging, via the second computing system, the first and second session; and
instructing, via the second computing system, the portable electronic device to display the second set of information on the domain.

12. The method of claim 11, wherein the first session includes information associated with additional physical objects.

13. The method of claim 12, wherein the second session includes one or more of: the first set of information associated with the at least one set of the like physical objects or information associated with one or more affinity objects.

14. The method of claim 13, wherein the first set of information associated with the at least one set of physical objects is automatically included in the second session in response to the second computing system determining a quantity of the at least one set of like physical objects is available on the domain.

15. The method of claim 14, further comprising transmitting, via the second computing system, instructions to the domain to automatically ship the quantity of the at least one set of like physical objects to an address associated with portable electronic device in response to the first set of information being included in the second session.

16. The method of claim 11, wherein the second set of information includes an expected date and time of fulfilment of the at least one set of like physical objects.

17. The method of claim 11, further comprising transmitting, via the portable electronic device, a device identifier to the second computing system in response to executing the application associated with the facility.

18. The method of claim 17, wherein in response to the portable electronic device scanning the first machine-readable element, further comprising:
retrieving, via the second computing system, information associated with the one or more affinity physical objects based on the device identifier and the at least one set of like physical objects; and
instructing, via the second computing system, the portable electronic device to display the information associated with the sets of like physical objects.

19. The method of claim 11, wherein the first set of information includes a second machine-readable element encoded with an identifier associated with the at least one set of like physical objects.

20. The method of claim 11, further comprising transmitting, via the at least one portable electronic device, a request to reserve a specified quantity of the at least one set of like physical objects to the second computing system in response to scanning and decoding the first machine-readable element.

* * * * *